US008469823B2

(12) United States Patent　　(10) Patent No.: US 8,469,823 B2
Roberts　　(45) Date of Patent: Jun. 25, 2013

(54) METHOD AND APPARATUS FOR GENERATING SPECIAL EFFECTS

(75) Inventor: Thomas J. Roberts, Alpine, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 1139 days.

(21) Appl. No.: 12/016,064

(22) Filed: Jan. 17, 2008

(65) Prior Publication Data

US 2009/0186705 A1　　Jul. 23, 2009

(51) Int. Cl.
　　*A63F 13/02*　　(2006.01)
(52) U.S. Cl.
　　USPC .......................................................... 463/47
(58) Field of Classification Search
　　USPC ....................................................... 463/31, 47
　　See application file for complete search history.

(56) References Cited

U.S. PATENT DOCUMENTS

| | | | | |
|---|---|---|---|---|
| 5,556,108 | A * | 9/1996 | Nagano et al. | 463/45 |
| 6,422,941 | B1 * | 7/2002 | Thorner et al. | 463/30 |
| 6,727,884 | B1 * | 4/2004 | Leatham et al. | 345/156 |
| 6,796,908 | B2 * | 9/2004 | Weston | 472/43 |
| 6,975,079 | B2 | 12/2005 | Lys et al. | |
| 7,248,230 | B2 * | 7/2007 | Piccionelli | 345/2.1 |
| 8,303,406 | B2 * | 11/2012 | Ackley et al. | 463/31 |
| 2002/0072408 | A1 * | 6/2002 | Kumagai | 463/31 |
| 2002/0082063 | A1 * | 6/2002 | Miyaki et al. | 463/1 |
| 2002/0101197 | A1 * | 8/2002 | Lys et al. | 315/291 |
| 2002/0118147 | A1 * | 8/2002 | Solomon | 345/30 |
| 2002/0158583 | A1 * | 10/2002 | Lys et al. | 315/82 |
| 2003/0057884 | A1 | 3/2003 | Dowling | |
| 2004/0085258 | A1 * | 5/2004 | Piccionelli | 345/2.1 |
| 2006/0084504 | A1 * | 4/2006 | Chan et al. | 463/39 |
| 2006/0205517 | A1 * | 9/2006 | Malabuyo et al. | 463/43 |
| 2006/0217197 | A1 * | 9/2006 | Biheller | 463/36 |
| 2006/0284459 | A1 * | 12/2006 | Real et al. | 297/217.3 |
| 2006/0287137 | A1 * | 12/2006 | Chu | 473/422 |
| 2007/0021205 | A1 * | 1/2007 | Filer et al. | 463/36 |
| 2007/0111774 | A1 * | 5/2007 | Okada | 463/16 |
| 2007/0173325 | A1 * | 7/2007 | Shaw et al. | 463/42 |
| 2008/0146333 | A1 * | 6/2008 | Kando et al. | 463/33 |
| 2008/0318687 | A1 * | 12/2008 | Backer et al. | 463/42 |
| 2010/0130286 | A1 * | 5/2010 | Ackley et al. | 463/42 |
| 2011/0111846 | A1 * | 5/2011 | Ciarrocchi | 463/30 |

* cited by examiner

*Primary Examiner* — Melba Bumgarner
*Assistant Examiner* — Seng H Lim
(74) *Attorney, Agent, or Firm* — Sheppard Mullin Richter & Hampton LLP

(57) ABSTRACT

Systems and methods for generating special effect are provided. In one embodiment, the method includes: receiving an input information from a game controller; generating an output data set based on the input information received by the game controller at a game console; transmitting the output data to a stage kit; and generating special effects at the stage kit based on the output data received from the game console.

9 Claims, 8 Drawing Sheets

METHOD AND APPARATUS FOR GENERATING SPECIAL EFFECTS

TECHNICAL FIELD

The present invention relates to real life gaming special effects, and more particularly, some embodiments relate to a system for generating fog, strobe lights, and flashing LEDs in response to output data of a game console.

DETAILED OF THE RELATED ART

Interactive video games typically allow the user, or player, to provide some form of input to a game. This is commonly accomplished by the use of a controller of one form or another. In one example, a controller might be a hand-held controller that has input features such as a plurality of buttons, analog joysticks, D-pad directional control and other user input devices that provide a means for a gamer to input desired controls to the game software. Such user input would typically affect the game activity on the video screen.

For example, a typical controller for a PlayStation, Xbox, or GameCube gaming console might have buttons (for example X, O, Δ, □ or X, A, B, Y buttons); analog joysticks to control game piece movement; a four-way D-Pad; trigger buttons; and other miscellaneous input buttons. Pressure sensitive buttons and analog joysticks mean that an ADC port for these controls can be added to allow appropriate response with minimal latency. As other examples, a controller might be configured as a joystick as is popular for flight simulator games, a steering wheel and pedal combination as is popular for driving games, and guitar or other musical instruments for interactive music-based games. As these examples illustrate, a controller for a gaming console or computer game might take on many diverse forms.

Until the advent of the popular PlayStation platform (circa 1996), feedback from video game play was limited to the visual and the audible. Players were provided information through the use of visual feedback via the display monitor and with various sounds. As technology has improved and processing speeds increased, the amount and quality of the audio and visual feedback has steadily improved. Additionally, video game interactivity has been enhanced by the addition of tactile feedback through the controller. It is now common for video game manufacturers to incorporate tactile feedback into game controllers. The most common form of physical feedback is vibration, also known as rumble, in the controller. Such vibration is often accomplished by providing motors with offset weighting on their shafts to provide a vibration or rumble sensation when the shaft is rotated. This might be triggered, for example, to make the controller rumble when a bomb is dropped, a car crashes, etc.

Rumble feedback is accomplished by having one or more built in motors inside of a game controller that spin an intentionally unbalanced weighted shaft. The vibration or rumble corresponds to an action in the game software or in the game set-up software. For example, in some fighting games, when a controlled game character is hit, the controller will vibrate. Or as another example, in a driving game, when a crash or car-to-car impact is experienced, the controller will vibrate. This type of vibration is known as 'passive' vibration, that is, it is accomplished by simply 'shaking' the controller. Game controller vibration can be tailored to offer specific tactile sensations that simulate the type or extent of activity occurring in the game.

Another form of tactile feedback can be accomplished with servo-mechanisms. A series of motors built into a game controller, directly or indirectly through the use of drive belts or gears, are connected to a game controllers control surfaces to actively oppose physical input made by the gamer. This is known as force feedback, and requires more complex servo-mechanisms and controller design than does passive vibration feedback. For example, in a steering wheel controller, force feedback would require a servo mechanism attached to the shaft of the steering wheel. Upon certain electronic commands, for example, in a very high speed turn, the servo-mechanism would act to make the steering wheel physically more difficult to turn. These various types of vibration or force feedback have become very common in modern day video games.

BRIEF SUMMARY OF EMBODIMENTS OF THE INVENTION

According to various embodiments of the invention, various features and functions can be included with a gaming controller or other gaming appliance or peripheral device to enhance the gaming experience. In accordance with an embodiment of the invention, a game system comprises: a game console; a game peripheral having a plurality of user input devices, the game peripheral is configured to send data to the game console based on an activation event of one of the input devices by a user; a "stage kit" device (or collection of devices) configured to generate a special effect based on a special effect information received from the game console, wherein the special effect information is generated by the game console based on the activation event.

In an another embodiment, the stage kit comprises: an LED device; a fog generator; and a strobe light. Each device in the stage kit can be configured to generate a special effect based on the special effect information received from the game console.

In accordance with yet another embodiment of the invention, a method for generating a special effect comprises: receiving an input information from a game controller; generating an output data set based on the input information received by the game controller at a game console; transmitting the output data to a stage kit; and generating special effects at the stage kit based on the output data received from the game console.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for providing various forms of feedback between a gamer and the gaming system. Particularly, one or more embodiments are directed toward providing feedback between the gamer and the gaming system by way of one or more various forms of controllers that might be used by a gamer in playing a game or in setting up or configuring the game.

Before describing the invention in detail it is useful to describe a few example environments with which the invention can be implemented. Description in terms of this example environment is provided to allow the various features and embodiments of the invention to be portrayed in the context of an exemplary application. After reading this description, it will become apparent to one of ordinary skill in the art how the invention can be implemented in different and alternative environments.

Figure 1:
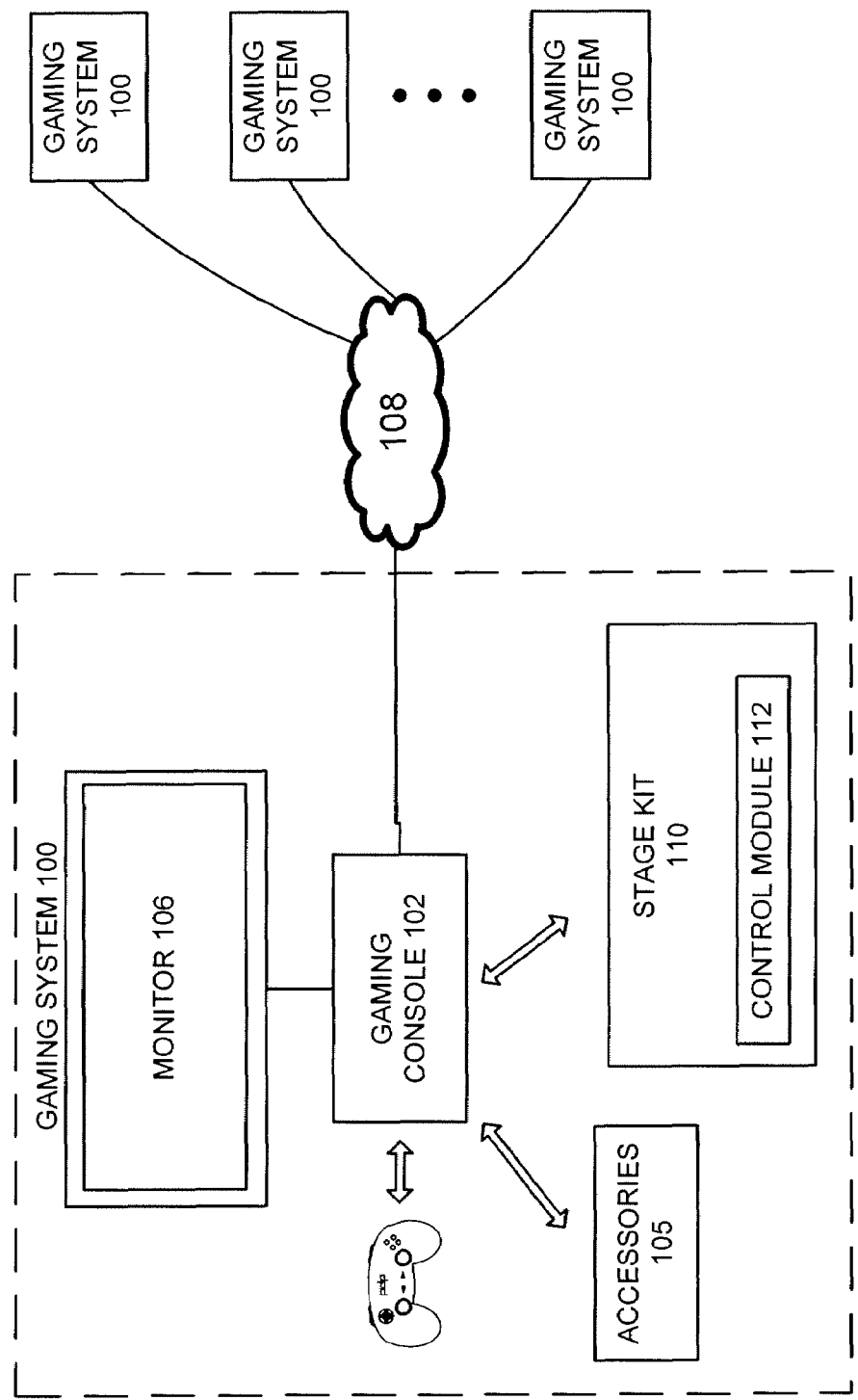
FIG. 1 is a block diagram illustrating a generalized version of a gaming system as one example of an environment with which the invention can be implemented.

One such example is that of a gaming system used by one or more video game players, or gamers, to play computer games or video games. FIG. 1 is a block diagram illustrating a generalized version of a gaming system 100 as one example of an environment with which the invention can be implemented. Referring now to FIG. 1, the example gaming system includes a gaming console 102, a monitor 106, a gaming controllers 104, game accessories 105, and a stage kit 110. The illustrated example also includes an interface to a communication medium or communication network 108 such as, for example, the internet or other communication channel.

In one environment, gaming console 102 might be implemented as a PlayStation 2, PlayStation 3, Xbox, Xbox 360, GameCube, Wii or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software.

A monitor 106 is typically provided to allow the gaming environment to display to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, Component Video, HDMI, and other signal types or specifications can be used to provide communications between gaming console 102 and monitor 106.

Although not illustrated, speakers can also be provided, typically with monitor 106, to provide audible information to the gamer during game play and during set up. For example, in one embodiment, monitor 106 might be implemented as a television with built in speakers that is connected to the gaming console via a coaxial or other audio and video input. As another example, in another embodiment, accessory 105 might be implemented as a hand-held controller with built in speakers that is connected to the gaming console via a cable or wireless signals.

Also illustrated in the example environment are gaming controllers 104 that can be used to allow gamers to provide input to the game software as well as to receive feedback from the game software during set up and game play. As described in the background section, controllers 104 can include, for example, X, Y, A, B buttons, trigger buttons, analog joysticks, key pads, and other devices to allow the user to provide input to the game. Thus by actuating the various buttons, switches or joysticks, the gamer can control the operation of the game or control characters or vehicles in the game. The interface between controllers 104 and gaming console 102 might be either wired and/or wireless interfaces as may be desired. Likewise, throughout this document, references to communication or signal interfaces can be implemented using wired or wireless interfaces, unless otherwise specified.

Game accessories or peripherals 105 can be a guitar, a drum set, a microphone, a steering wheel, a keyboard, a mouse, a gun, or other type of game controller. Each of the accessory 105 can be connected to game console 102 via a wireless or wired interface.

In one embodiment, stage kit 110 includes a light show generator, a strobe light, a fog generator, and a stage kit control module 112. The light show generator can be an array of light emitting diodes (LEDs). The array of LEDs can be disposed in a housing having reflective surfaces configured to project lights from the LEDs in various directions. The strobe light is configured to emit lights that flash at various frequencies or cycles such as, for example, 6, 8, 10, and 12 Hz. The fog generator can be standard a glycol or glycerin-based fog generator. Stage kit control module 112 is configured to control the functionalities of each component of the stage kit, including the light show generator, the strobe light, and the fog generator. Stage kit control module 112 can be integrated on any one of the stage kit other components. In one embodiment, the stage kit control module 112 is integrated into the light show generator. Alternatively, the stage kit control module 112 can be integrated into the fog generator.

Each component of stage kit 110 can be configured to communicate with other components via a wired or wireless interface. In one embodiment, the strobe light is physically attached to the fog generator and they are in wired communication with each other. In one embodiment, fog generator is connected to the light show generator via a wired interface. Similarly, the light show generator can be in a wired communication with game console 102. Stage kit control module 112 can also be configured to communicated with game console 102 using either a wired or wireless interface.

Also illustrated in the example of FIG. 1 is a communications connection to a network 108. For example, a user may wish to connect the gaming console 102 to the internet or other communication medium whereby game information can be downloaded or uploaded to various websites, online services such as Xbox Live, or other entities or services. Also, through a communication medium 108, garners might compete amongst other gamers at their gaming systems 100, even if such other gamers at remote location. Note that depending on the gaming environment, remote gaming systems 100 might or might not have similar configurations to one another.

Figure 2A:
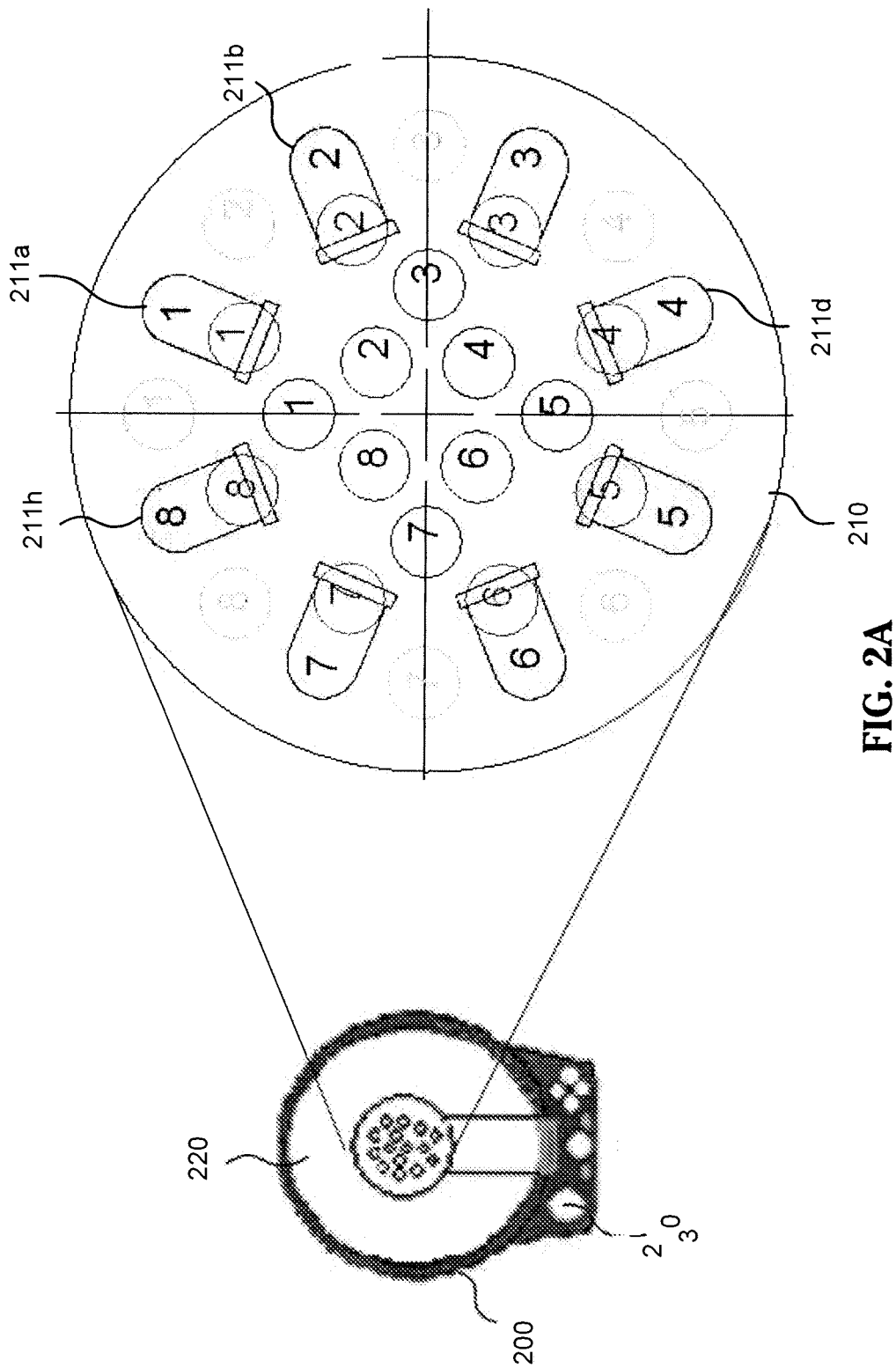
FIG. 2A-B illustrate a stage kit LED device according to one embodiment of the present invention.
Figure 2B:
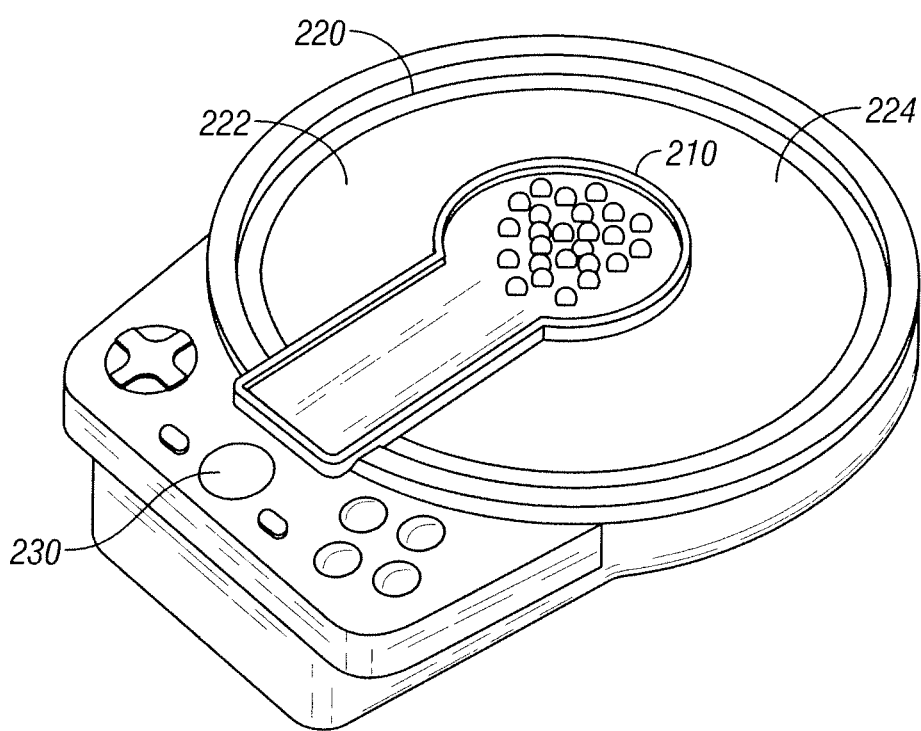

FIGS. 2A-B are diagrams illustrating an LED light array device 200 in accordance with one embodiment of the present invention. Referring to FIG. 2A, in one embodiment, LED device 200 includes an LED array 210, light conditioner area 220, and user interface 230. LED device 200 can be configured to connect to game console 102 via a wire or wireless interface. In one embodiment, LED device 200 is configured to communicate with game console 102 via a USB port of game console 102.

As shown in FIG. 2A, in one embodiment, LED array 210 has eight groups of LEDs arranged in a circular fashion. Although a circular arrangement is shown, other shapes such as, for example, square and triangle could be also used. LED array 210 can also have more or less than four LED groups. In one embodiment, each group of LEDs has a total of eight LEDs. Each LED in a group, for example, the group of LEDs 211a-h, can be in different colors such as, for example, red, green, blue, and yellow. Alternatively, each LED of the group of LEDs 211a-c can be the same color. Preferably, the color of the LEDs of an adjacent groups is different. Alternatively, the color of LEDs in an adjacent group can the same.

Each LED or group of LEDs can be switched based on information received from a game console. In one embodiment, LED device 200 is configured to switch one or more of the LEDs or groups of LEDs based on signals received from the game console. In one embodiment, LED device 200 is configured to receive data from game console 102 via a peripheral input channel. In some consoles, the peripheral input channel is used to control the rumble (vibration) function of a controller. In an example of the Xbox 360 game console, the peripheral input channel can be configured to deliver two 16 bits words to a controller connected to the Xbox 360 console. Thus, for the Xbox 360, LED device 200 is configured to switch LED array 210 based on one or both of the 16 bits data words received from the peripheral input channel.

Referring now to FIG. 2B, light conditioner area 220 includes a clear lid 222 and a concave-shaped cavity 224. Lid 222 can be made with a clear plastic or glass to allow light to be transmitted there through. The surface of cavity 224 is configured to reflect and diffract light from LED array 210. Although not shown, in one embodiment, one or more LEDs of each group of LEDs can be positioned such that light will be emitted downward towards cavity 224. In this way, various lighting effects can be achieved.

In one embodiment, LED device 200 includes a user interface 230 configured to send a user's feedback to game console 102. Using user interface 230, the user may change settings of a game, save or load a game, etc. In one embodiment, user interface 230 includes a directional-pad (D-pad), a back button, a start button, and a plurality of control buttons such as, for example, X, Y, A and B buttons.

Figure 3:
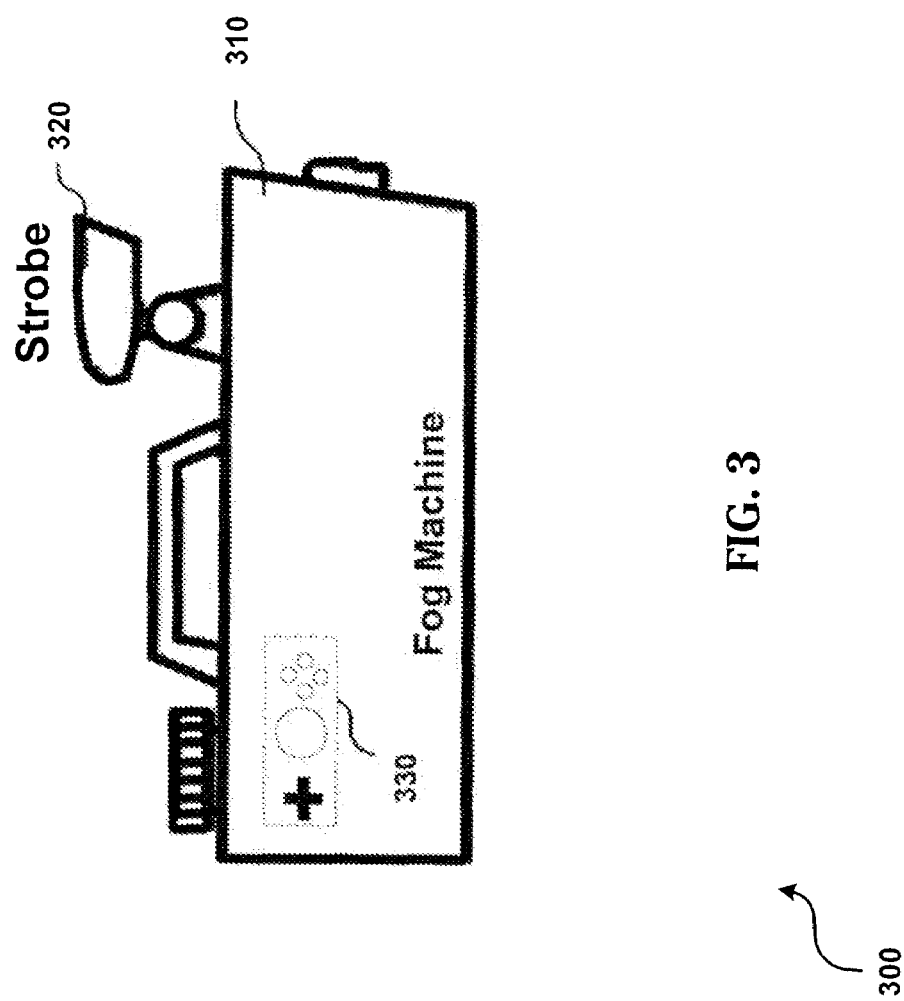
FIG. 3 is a diagram illustrating a fog generator according to one embodiment of the present invention.

FIG. 3 is a diagram illustrating a fog generator & a strobe light assembly 300 according to one embodiment of the present invention. Referring to FIG. 3, assembly 300 includes a fog generator 310 and a strobe light 320. As mentioned above, fog generator 310 may be a glycol or glycerin-based fog generator, although other fog generation techniques can be used. Fog is generated when a "fog juice" (glycol or glycerin-based fluid) is pumped to a heater that evaporates the juice to form fog. Although a glycol or glycerin solution is discussed, other suitable type of chemicals can be also used to generate fog.

In one embodiment, fog generator 310 is powered by an AC power source such as, for example, power from a wall plug. Alternatively, fog generator 310 can be powered by a DC power source such as, for example, batteries. As shown in FIG. 3, in one embodiment, strobe light 320 is physically attached fog generator 310. In this way, strobe light 320 may obtain power from fog generator 310. Assembly 300, as shown, can be placed in an area where the fog and strobe light effects can be experienced by the user while playing game such as, for example, behind or in front of the display screen.

In one embodiment, strobe light 320 is an separate standalone unit that can be placed away from fog machine 310. In this embodiment, strobe light 320 can be configured to communicate with fog machine 310 through a wired or wireless interface. Additionally, strobe light 320 can be powered by battery, direct connection to an AC outlet, or via a wired connection to fog generator 310.

The functionalities of strobe light 320 can be controlled by the stage kit control module 112 (not shown) that may reside on fog machine 310 or elsewhere in gaming system 100 such as for example, a game controller, and a LED light array device, etc. For example, in one embodiment, the stage kit control module 112 is located on a LED light array device, which is in communication with game console and fog generator 310. In this example, game console may switch on/off the fog and lights of fog generator 310 and strobe light 320 via the stage kit controller located on the LED light array device. In one embodiment, strobe light 320 is configured to be in direct communication with the stage kit controller. In this way, depending on the location of the stage kit controller, strobe light 320 can be independent from fog generator or the LED light array device.

As described above, stage kit 110 provide lights and fog special effects using LED device 200, fog generator 310, and strobe light 320. The functionalities of these devices can be switched on and off by a stage kit controller module 112 that is configured to receive data from game console 102. In one embodiment, stage kit controller module 112 is configured to control LED device 200, fog generator 310, and strobe light 320 using data received from a peripheral input channel. For example, in operation, stage kit controller module 112 receives information from console 102. Using the received information, controller module 112 can switch on/off the fog, the LED array, and strobe lights. Controller module 112 can also set the operational settings of the fog, LED array, and the strobe light such as, for example, how frequent the fog should be emitted and strobe light should strobes.

In one embodiment, fog generator 310 includes an AC-to-DC converter (not shown) for converting a 120V AC into 12V DC. The DC power output can then be used to power peripheral devices connected to fog generator 310 such as, for example, the LED light array device 200 and strobe light 320. A USB port of a game console can provide up to 5V DC power. In general, this is sufficient for most game controllers connected to the USB port of the game console. However, in certain operating modes, the power requirements of the LED light array device and strobe light 320 may exceed 5V. Thus, in one embodiment, the AC-to-DC converter of fog generator 310 can be used to power one or more peripheral devices connected to fog generator 310. Alternatively, AC power can be sent from fog generator 310 to peripheral devices. However, the power requirements and supplies in the foregoing examples are not determinative of the direction of data flow between the various elements. For example, if AC power is being sent from fog generator 310 to peripheral devices, such peripheral devices may still be concurrently sending data signals to fog generator 310.

In one embodiment, fog generator 310 includes a user interface 330 configured to send a user's feedback to game console 102. Similarly to interface 230, interface 330 can be used to change settings of a game, save or load a game, etc. Also similar to interface 230, user interface 330 can include a D-pad, a back button, a start button, and a plurality of control buttons such as, for example, X, Y, A and B buttons. Preferably, only one user interface is needed for stage kit 110. Alternatively, user interface 230 is not included in LED device 200 and user interface 330 is provided as the only user interface to console 102. As mentioned, the stage kit control module 112 can be either on the LED device 200 or the fog generator 310. In one embodiment, the user interface is preferably located on the same stage kit component where the stage kit control module 112 is located.

In one embodiment, fog stage 310 includes a manual interface (not shown) configured to allow the user to manually change the operational settings of fog stage 310 and strobe light 320. Using the manual interface, the user may perform one or more of the following: switch on/off the heater of fog generator 310, switch on/off the fog generator 310 and strobe light 320, and switch on/off the power supply to LED array 200.

Figure 4:
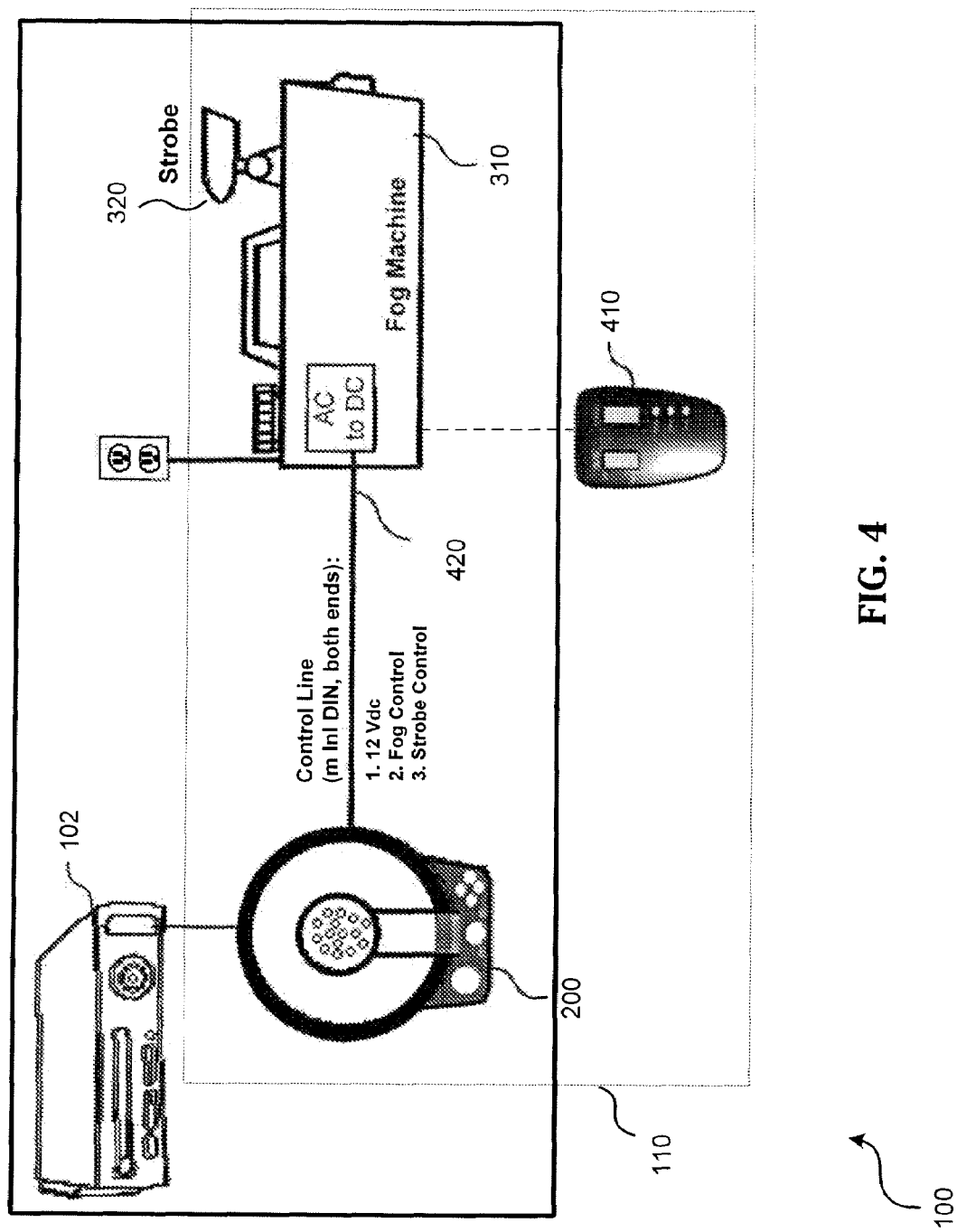
FIGS. 4-5 are diagrams illustrating how a stage kit can be implemented with a game console in accordance to embodiments of the present invention.

FIG. 4 is a diagram illustrating how stage kit 110 can be implemented with a game console according to one embodiment of the present invention. Referring to FIG. 4, a system 400 includes game console 102, LED device 200, fog machine 310, strobe light 320, and a remote control 410. LED device 200 can be connected to game console 102 wirelessly or via a USB port of game console 102. In system 400, stage kit controller module (not shown) is located on LED device 200. In this embodiment, data signals from game console 102 for controlling stage kit 110 special effects (e.g. LED array 210, fog machine 310, and strobe light 320) are sent to stage kit controller module on LED device 200 via a feedback communication channel such as, for example, a peripheral input channel. Specific data structure of the data word used to control LED array 210 is discussed in further detail below.

As shown in FIG. 4, LED device 200 is connected to fog generator 310 via a cable 420. Cable 420 is configured to send control signals to fog machine 310 and strobe light 320 and also to provide LED 200 with additional power. Additionally, remote control 410 can provide various manual override functions such as, for example, on/off controls of smoke and strobe light and frequency control of the strobe light. For example, using remote control 410, the user may set the strobe light to flash at 12 Hz, 10 Hz, or 6 Hz.

In one embodiment, strobe light 320 can be directly attached to fog machine 310. In this way, strobe light 320 can obtain power directly from fog machine 310. Alternatively, strobe light 320 is detached from fog machine 320 and has its own power source such as, for example, battery or an AC plug. In one embodiment, system 400 can have more than one strobe light 320. In this way, more special effects can be generated. In this embodiment, the user may use interface 230 or 330 to inform game console 102 of the number of strobe lights in stage kit 110.

Figure 5:
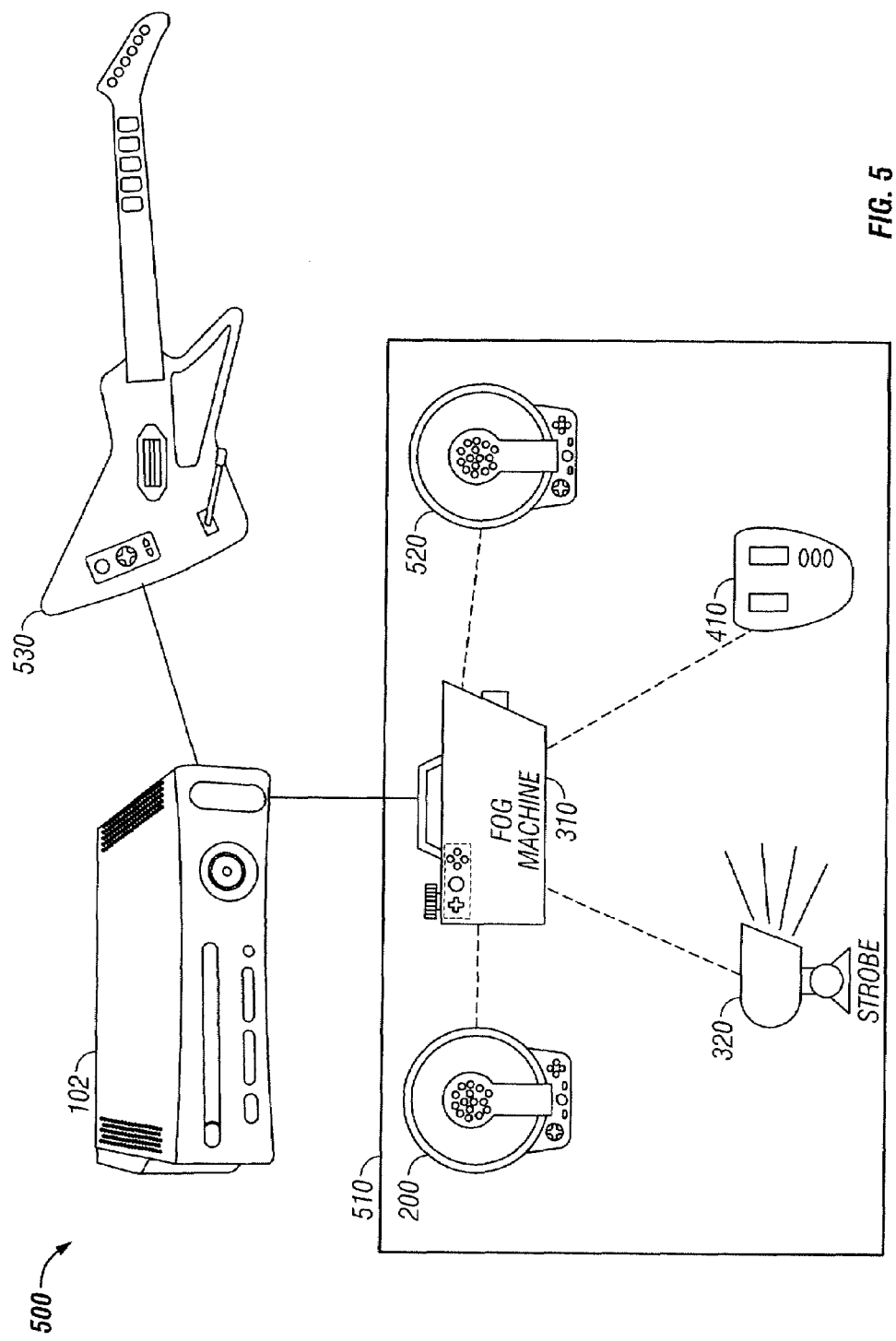

FIG. 5 is a diagram illustrating how stage kit 110 can be implemented with a game console according to one embodiment of the present invention. Similar to system 400, FIG. 5 illustrates a system 500 that includes game console 102 and a stage kit 510. Stage kit 510 includes LED device 200, fog machine 310, strobe light 320, a remote control 410, a second LED device 520, and a guitar peripheral 530. Additionally, stage kit 510 can have some or all of the functionalities of stage kit 110. As shown in FIG. 5, game console 102 is directly connected to fog machine 310 instead of LED device 200. Thus, in this embodiment, stage kit control module 112 is located on fog machine 310. Each stage kit component of stage kit 510 (e.g., LED device 200, strobe light 320, remote control 410, and LED device 510) can be wirelessly connected to fog machine 310. Preferably, each component is connected to fog machine 310 via a cable, which can be a conduit for data and power transfer.

System 500 can have one or more LED device 200 and strobe light 320. For example, a second LED device 520 can be provided. In this way, more special effect can be generated. Additionally, since fog machine 310 is directly connected to game console 102 instead of LED device 200, the user interface that is normally on LED device 200 can be optional. Preferably, in this embodiment, user interface 330 is the only user interface.

Additionally, system 500 can include one or more game peripherals such as, for example, a musical peripheral 530. Musical peripheral 530 may be a drum (not shown), a microphone (not shown), or a guitar peripheral. Stage kit 510 can be implemented to react to notes played or sung using a musical peripheral such as, for example, a guitar peripheral 530. In one embodiment, this is accomplished by analyzing data received from game console 102 via a peripheral input channel. In this embodiment, whenever a note or chord is played on guitar peripheral 530, the note or chord information is sent to game console 102, which in turns sent that information to stage kit 510. In this way, stage kit 510 can generate a specific special effect based on the note or chord played. In one embodiment, system 500 can be configured to generate a certain special effect when an incorrectly note is played or when certain events in a game occur.

Alternatively, stage kit 110 or 510 can be configured to be in direct communication with a musical peripheral such as, for example, guitar peripheral 530. In this way, when a note or chord is played, stage kit 510 can generate a special effect (e.g. fog, strobe, and LED effects) based on the data received directly from the music peripheral.

As previously described, game console 102 can control the functionalities of each of the stage kit components via a peripheral input channel. Data that are normally used to control the motor speed for the two vibration motors in a controller are altered with a data structure for controlling various functions of each stage kit component. In an example of the Xbox 360, a command is sent from the Xbox 360 to the stage kit control module 112 of the stage kit 110 or 510 via the XInputSetState( ) call from the DirectX xInput API. Again, in a standard application, this call is used to specify the motor speed for the two vibration motors inside of the Xbox 360 controller using two 16-bit length data words, one word for each motor. For use with the stage kit, the data structure of the two 16-bit length data words are modified to control special effects functions of each component of the stage kit.

In one embodiment, only the higher 8 bits of each 16-bit length word are used to control the special effect functions of the stage kit.

Each 16-bit data word comprises 16 bit positions: [0-15]. The value of the high 8 bits (i.e., 8-15) of each data word is used to control various functions of the stage kit. As mentioned, there are two 16-bit length data words, one for the RightMotorSpeed and one for the LeftMotorSpeed. In one embodiment, bits [8 . . . 10] of the RightMotorSpeed word can be used to control every special effect functions of the stage kit (e.g., fog and strobe light) except for the LEDs' functions. In one embodiment, the data structure that assigns the value of bits [8-10] to a corresponding stage kit control function is as follows:

0xX0FF—if this value is set only the LED's are changed
0xX1FF—Fog Machine ON
0xX2FF—Fog Machine OFF
0xX3FF—Strobe Light ON @ 6 Hz
0xX4FF—Strobe Light ON @ 8 Hz
0xX5FF—Strobe Light ON @ 10 Hz should be 0x20FF (8447) to specify a toggle of the LEDs in LED ring 1. The bit pattern for each Motor Speed would be as follows with the relevant bits being underlined: the LeftMotorSpeed word is [11111111 1111 1111] and the RightMotorSpeed word is [0010 0000 1111 1111], which is further illustrated by Table 1 below.

TABLE 1

Bits [15 . . . 8] of wLeftMotorSpeed:
All "ones" will indicate an "ON" toggle of
all the LED's in the specified LED ring:

LED ID (mapping within each colored LED ring):  1 2 3 4  5 6 7 8
wLeftMotorSpeed = 1 1 1 1  1 1 1 1  1 1 1 1  1 1 1 1 wRightMotorSpeed = 0 0 1 0  0 0 0 1  1 1 1 1  1 1 1 1

Bits[15 . . . 13] of wRightMotorSpeed control which LED Ring to update. Example: Code 001 specifies Blue LED Ring to be updated.

Bits[10 . . . 8] of wRightMotorSpeed control Fog machine and Strobe Light. Example: Code 001 turns Fog Machine ON.

0xX6FF—Strobe Light ON @ 12 Hz

0xX7FF—Strobe Light OFF

For example if the Fog Machine is to be turned on, then the value of bits [8-10] of the RightMotorSpeed word should be 0x01FF (511). It should be noted that any of the bit values and functions illustrated above can be interchanged and modified to perform other functions.

In one embodiment, bits [11 12] of the RightMotorSpeed word are used to control functions of LED array 210. For example, in one embodiment, the data structure that assigns the value of bits [11-12] to a corresponding stage kit control function is as follows:

00—no change

01—Motor 1 updated to PWM value 0xXX

10—Motor 2 updated to PWM value 0xXX

11—Laser Light on/off toggle (each time you send this command it will toggle the Laser Light on/off)

Again, it should be noted that any of the bit values and functions illustrated above can be interchanged and modified to perform other functions.

In one embodiment, bits [13 14 15] of RightMotorSpeed world can be configured to control the 8 groups of LED of LED array 210. Further, bits [8-15] of the LeftMotorSpeed word can be configured to control the on/off status of each LED in the group of LED. In one embodiment, each group of LED has 8 LEDs. An example of the bits [13 14 15] values and their corresponding functions is shown below.

| LeftMotorSpeed word | Bits [13 14 15] of RightMotorSpeed word |
|---|---|
| 0xXXFF | 000 - LEDS no change |
| 0xXXFF | 001 - LED ring 1 updated to value 0xXX |
| 0xXXFF | 010 - LED ring 2 updated to value 0xXX |
| 0xXXFF | 011 - LED ring 3 updated to value 0xXX |
| 0xXXFF | 100 - LED ring 4 updated to value 0xXX |
| 0xXXFF | 101 - ALL LEDs OFF |
| 0xXXFF | 110 - ALL LEDs ON |
| 0xXXFF | 111 - ALL effects OFF (Master Turn OFF) |

For example if LED ring 1 is to be turned on, then the value of wLeftMotorSpeed should be 0xFFFF (65535) indicate "ON" for all of the LEDs in the ring and wRightMotorSpeed In one embodiment, a code to turn all the LEDs in LED ring 1 ON and turn the Fog machine on can be written as follows:

```
XINPUT_VIBRATION * vibration;
ZeroMemory( &vibration, sizeof(XINPUT_VIBRATION) );
Vibration.wLeftMotorSpeed = 0xFFFF ;   // 65535
Vibration.wRightMotorSpeed = 0x21FF ; // 8703
XInputSetState( i, &vibration);
```

Referring again to FIG. 2A, LED array 210, as shown, each LED is numbered to indicate which bit value they correspond to in the LeftMotorSpeed word.

Figure 6:
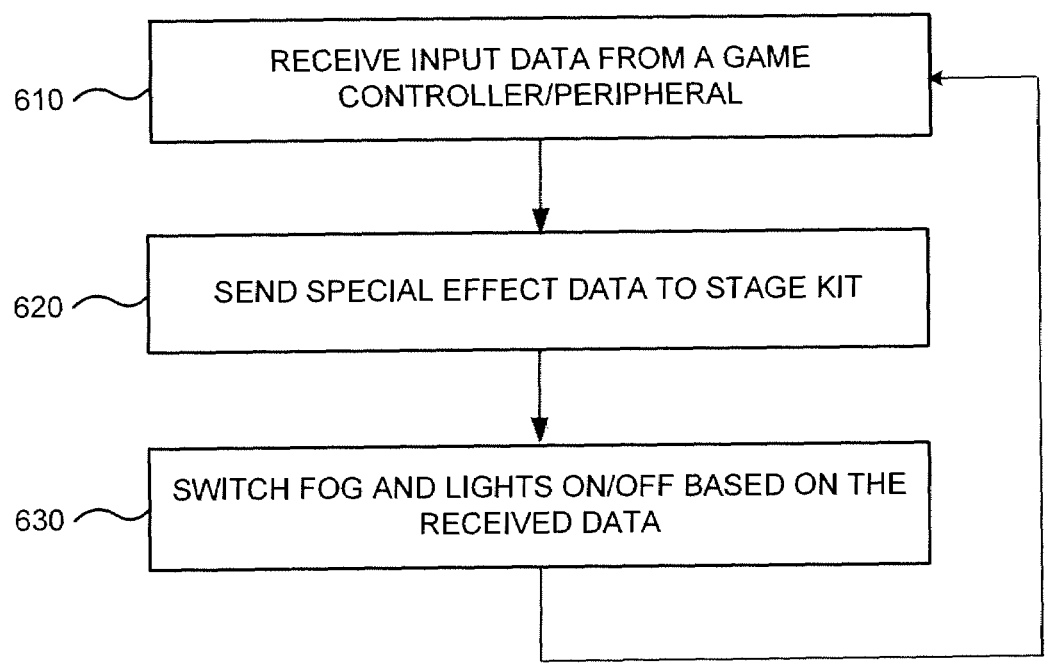
FIGS. 6-7 are diagrams illustrating examples functional block diagram of a stage kit in accordance with one embodiment of the invention.

FIG. 6 is a diagram illustrating a high level process flow of the stage kit according to one embodiment of the present invention. Referring to FIG. 6, process flow 600 starts at a step 610. In step 610, data from a game controller or a game peripheral such as guitar peripheral 530 data are sent to the game console. Data outputted by the game controller or guitar peripheral 530 are generated based on the buttons, D-Pads, or other type of interface the user activated. In a step 620, a special effect data set is generated based on the input data received from a game peripheral or based on the game play environment or a combination of both. In one embodiment the special effect data set is in a form of one or more 16-bit data words configured to be transmitted via a peripheral input channel of the game console. Once the special effect data set is generated, it can be sent to the stage kit. For example, during game play, game console 102 can send special effect data to stage kit 110 via a peripheral input channel.

In a step 620, special effects such as fog, strobe lights, and LED lights, are switched on/off based on the data received from the game console. For example, stage kit 110 can be implemented in a music game having guitar peripheral 530. In this example, stage kit 110 can be implemented to switch on LED rings or groups 1 and 3 whenever a note such as, for example, a 'A' note, a 'B' note, or a 'D' note is played. As a further example, stage kit 110 can be implemented to switch on strobe light 320 and/or fog 310 whenever 10, 20, or any specified number of consecutive notes are played correctly. In one embodiment, fog, strobe lights, and LED lights are switched on/off based on the value of the special effect data set. In one embodiment, steps 610-630 are continuously repeated during game play.

Figure 7:
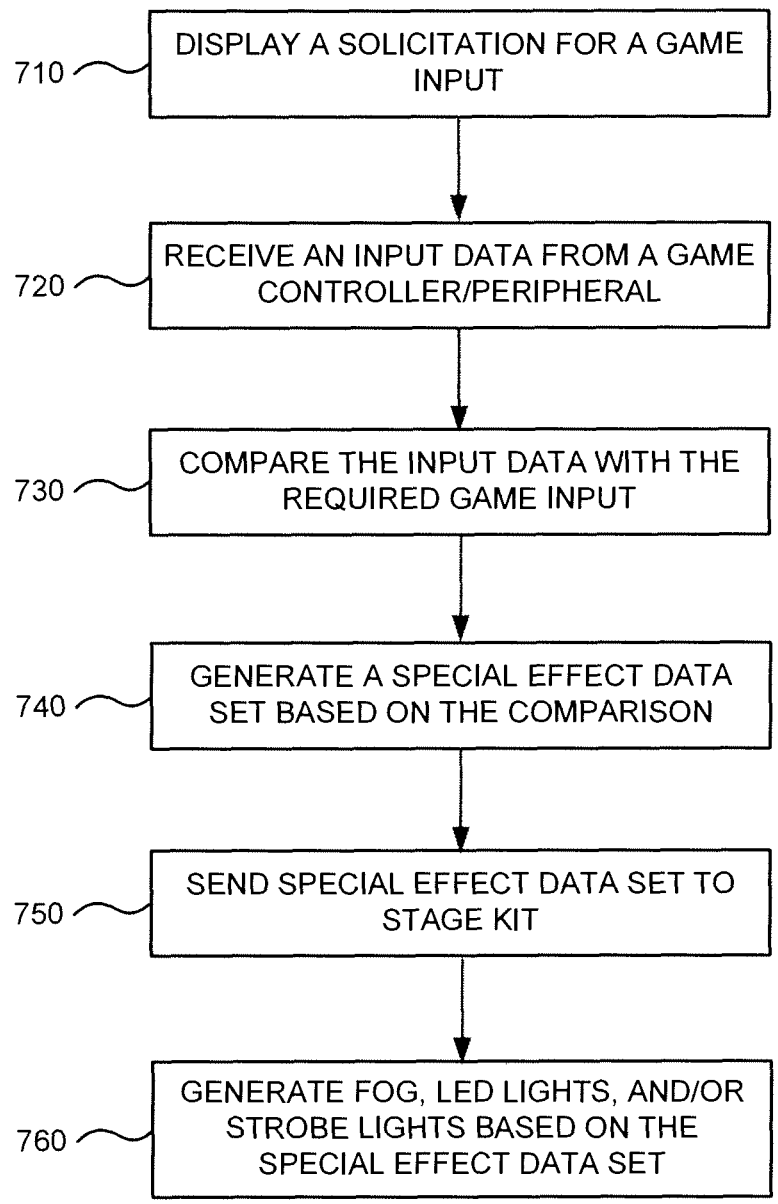

FIG. 7 is a diagram illustrating a process flow 700 of a stage kit being implemented in a gaming system according to one embodiment of the present invention. Referring to FIG. 7, flow 700 starts at a step 710 where a solicitation for a game input is displayed. For example, in a music game, a note is displayed on the screen with an indication of a button on a controller or a game peripheral such as, for example, guitar 530 next to the note. This display of the note and the button indicator is a solicitation for the user to press the displayed button on the game peripheral.

In a step 720, data from the game peripheral is received by the game console. Once the user reacts to step 710 and presses a button or other type of user input, the game peripheral sends out an input data to the game console.

In a step 730, the input data received by the game console is compared with the solicited game input. For example, game console can display a note and solicit the user to press the x-button at a certain time. Once the user press a button and the controller sends that data to the game console, the game console checks to see whether the x-button was actually pressed and not some other button. Based on the comparison, the game console generates a value or a special effect data in a step 740.

In a step 750, the generated special effect data set are sent to the stage kit. As previously discussed, feedback data can be sent from the console to the controller via a peripheral input channel.

In a step 760, special effects such as, for example, fog, LED lighting patterns, and strobe lights can be generated based on the special effect data set. For example, in one embodiment, the user can be awarded with a fog effect, strobe light effect at 12 Hz, and various LED display patterns whenever the user played 50 consecutive notes correctly.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A game system, comprising:
a game console;
a first game peripheral coupled to the game console, the first game peripheral providing a first user interface configured to generate input data; and
a second game peripheral for generating special effects comprising:
  a game console interface configured to communicate with the game console over a peripheral input channel, wherein the game console interface identifies the second game peripheral as a game controller to the game console,
  a control module configured to receive special effect information from the game console through the game console interface,
  a special effect generator electrically coupled to the control module and configured to generate a special effect based on special effect information received by the control module from the game console, wherein the special effect generator comprises a fog generator and wherein the special effect information is generated by the game console based on the input data from the first game peripheral, and
  a second user interface electrically and mechanically coupled to the fog generator and configured to cause the game console to change a game setting, save a first game, or load a second game,
  wherein the second user interface is disposed on the fog generator, and
  wherein the control module is integrated with the fog generator.

2. The game system of claim 1, wherein the special effect generator comprises:
a LED device;
and
a strobe light.

3. The game system of claim 2, wherein a component of the special effect generator is configured to generate a special effect based on the special effect information received from the game console.

4. A game peripheral for generating special effects comprising:
a game console interface configured to communicate with a game console over a peripheral input channel, wherein the game console interface represents the game peripheral as a game controller to the game console;
a control module configured to receive special effect information from the game console through the game console interface;
a special effect generator electrically coupled to the control module and configured to generate a special effect based on special effect information received by the control module from the game console, wherein the special effect generator comprises a fog generator and wherein the special effect information is generated by the game console based on input data from a game controller coupled to the game console; and
a user interface electrically and mechanically coupled to the fog generator and configured to cause the game console to change a game setting, save a first game, or load a second game,
wherein the user interface is disposed on the fog generator, and
wherein the control module is integrated with the fog generator.

5. The game peripheral of claim 4, wherein the special effect generator further comprises an LED device.

6. The game peripheral of claim 5, wherein the special effect generator further comprises a strobe light.

7. A method for generating special effects, comprising:
receiving input data from a first game peripheral at a game console;
generating an output data set based on the input data received from the first game peripheral at the game console;
transmitting the output data to a second game peripheral for generating special effects, wherein the second game peripheral comprises:
  a game console interface configured to communicate with the game console over a peripheral input channel, wherein the game console interface identifies the second game peripheral as a game controller to the game console,
  a control module configured to receive special effect information from the game console through the game console interface,
  a special effects generator electrically coupled to the control module and configured to generate a special effect based on special effect information received by the control module from the game console, wherein the special effect generator comprises a fog generator and wherein the special effect information is generated by the game console based on the input data from the first game peripheral, and
  a user interface electrically and mechanically coupled to the fog generator and configured to cause the game console to change a game setting, save a first game, or load a second game; and
generating special effects at the second game peripheral based on the output data received from the game console,
wherein the user interface is disposed on the fog generator, and
wherein the control module is integrated with the fog generator.

8. The game system of claim 2, wherein the fog generator is communicatively coupled to the game console, and wherein the LED device and strobe light are communicatively coupled to the fog generator.

9. The game peripheral of claim 6, wherein the fog generator is communicatively coupled to a game console, and wherein the LED device and strobe light are communicatively coupled to the fog generator.

* * * * *